Jan. 18, 1927.
O. E. GRIGSBY
1,615,079
VISOR FOR AUTOMOBILES
Filed August 8, 1923
2 Sheets-Sheet 1
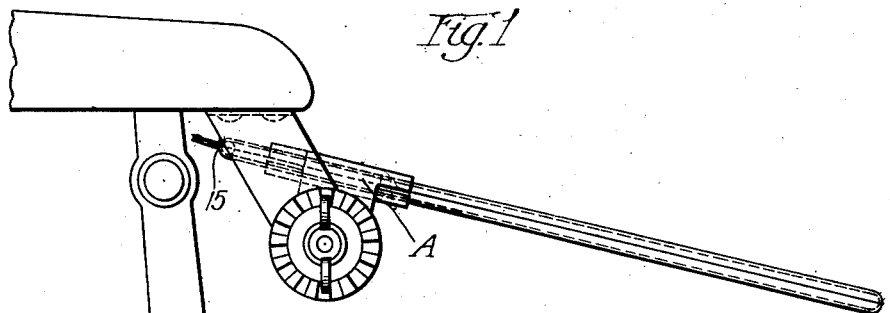
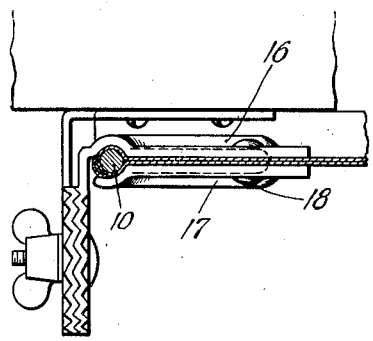
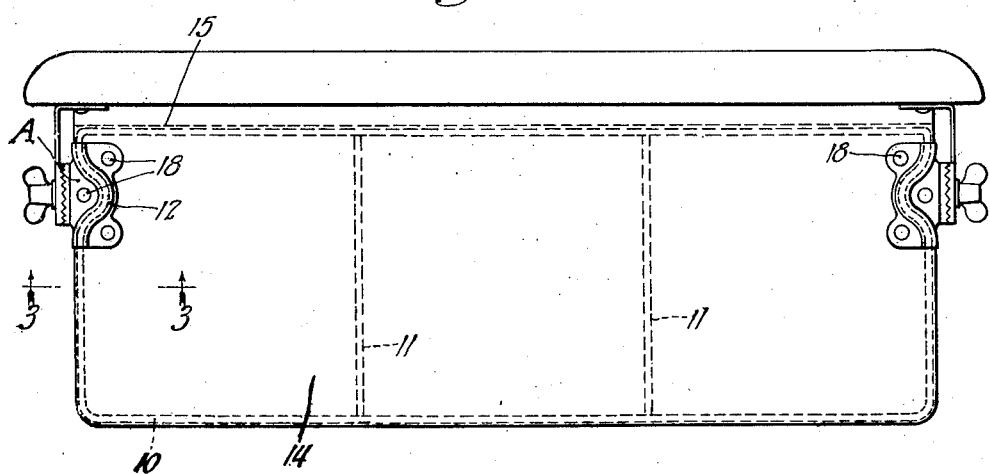
Inventor
Owen E. Grigsby
By George E. Mueller atty.

Jan. 18, 1927.  
O. E. GRIGSBY  
1,615,079  
VISOR FOR AUTOMOBILES  
Filed August 8, 1923  2 Sheets-Sheet 2
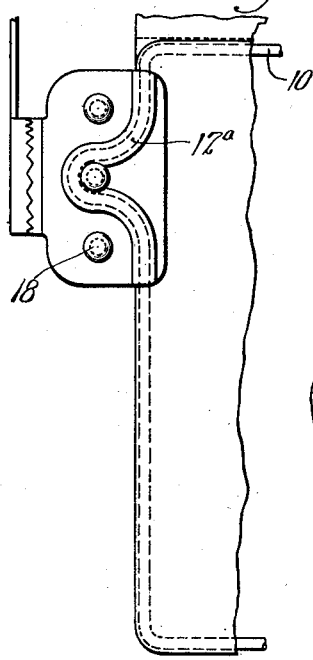
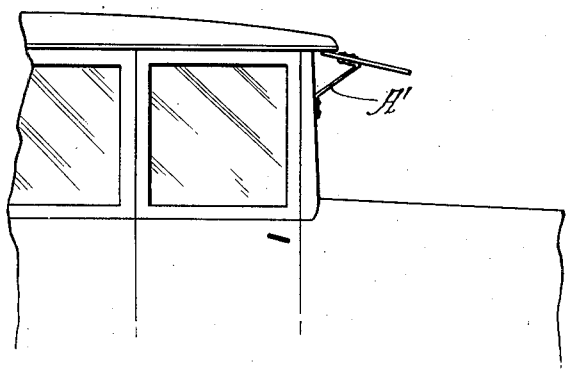
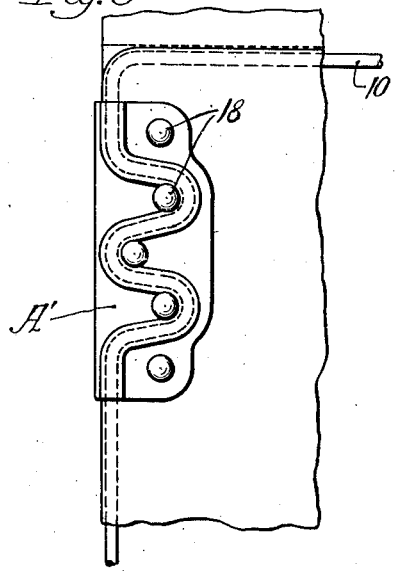
Inventor  
Owen E. Grigsby  
By George E. Mueller  
Atty.

Patented Jan. 18, 1927.

1,615,079

UNITED STATES PATENT OFFICE.

OWEN E. GRIGSBY, OF PARK RIDGE, ILLINOIS, ASSIGNOR TO GRIGSBY-GRUNOW-HINDS CO., OF CHICAGO, ILLINOIS, A CORPORATION OF ILLINOIS.

VISOR FOR AUTOMOBILES.

Application filed August 8, 1923. Serial No. 656,440.

My invention relates to visors for automobiles, and has to do more particularly with visors of the type ordinarily placed in front of the windshield so as to protect the windshield from snow, rain and sleet and also protect the driver's eyes from the glare of lights and the sun.

An object of my invention is to provide an improved construction, and more particularly to provide an improved visor frame and bracket arrangement.

For a better understanding of my invention reference is to be had to the accompanying drawings, in which—

Fig. 1 is a side or end view of my improved visor shown mounted to the front bow of the top;

Fig. 2 is a plan view of the visor turned down in the brackets;

Fig. 3 is a cross sectional view through a portion of the visor along the line 3—3 of Fig. 2;

Fig. 4 is a view of one end of a visor, showing a modified form of frame and bracket;

Fig. 5 shows a rigid bracket arrangement, preferably for attachment to closed bodies; and Fig. 6 shows a modified form of frame arranged more particularly for the rigid bracket construction of Fig. 5.

Referring now more in detail to the preferred form of my invention as shown in Figs. 1 to 3, I provide a suitable rectangular marginal frame made up of suitable metallic rod material 10. A suitable number of braces 11 may also be provided. The marginal portion 10 of the frame is preferably made up of round rod material, and to this end we have found quarter-inch rod very suitable. The frame may be made up of one or more pieces, but we preferably form it from one rod welded where the ends join. Before completely bending the four sides of the frame and welding it, I provide projections on the frame for suitably supporting the brackets in such a way that the brackets may be applied to the outside of the frame over the projection and clamped thereto so as to be positively immovably attached. To this end I preferably bend the rod inwardly out of its axial line, as shown at 12, forming it sufficiently so as to provide a suitably large holding or clamping surface for the bracket A. The construction of the bracket A and formed portion 12 is preferably such that when the bracket is secured over the bent portion, the bracket can not turn on the frame or move longitudinally along the rod. The bent portions 12 may be placed in suitable positions along the frame intermediate its corners, and I preferably bend it at its ends as shown in Fig. 2.

A suitable covering is provided for the frame, preferably in the form of a fabric sack like member 14 which is drawn over the frame and then fastened in a suitable way, preferably by sewing it along its rear edge 15.

The brackets A are preferably applied one to each end of the visor and in the form shown in Figs. 1 to 3 an adjustable bracket is applied adapted to be attached underneath the front bow of the top. The visor attached portion of the bracket comprises preferably upper and lower clamping plates 16—17, which I preferably shape to conform to the bent portion of the frame so as to be positively held in position and thereby prevent turning or longitudinal movement of the bracket.

The bracket may be attached to the frame in any suitable way, and I preferably employ a number of rivets 18 positioned between and outside the bent portion 12 of the frame so as to suitably clamp the bracket and retain it in position.

It is to be understood that the frames and brackets may be made up in various ways, depending upon the manner in which they are to be applied, and the frame may be formed inwardly on its end sections at any point intermediate the corners, or along the rear side of the frame.

In Fig. 4 I have shown a modified form of frame, in which the holding portion 12ª is bent outwardly from the frame and the attaching portion of the bracket formed accordingly.

In Figs. 5 and 6 I have shown another form of my invention adapted more particularly to closed car bodies, having a rigid bracket A' and with the frame formed with several indentations so as to provide a longer and more rigid attaching surface for the bracket.

I have shown several forms of my invention but this is for illustration and I contemplate making it in other ways than that shown and described, and therefore do not desire to be limited to these exact structures, but aim to cover all that which comes within the spirit and scope of the appended claims.

What I claim as new and desire to secure by United States Letters Patent is:

1. A visor for automobiles comprising a rectangular marginal frame of rod material the end sides of which are laterally sinuously deflected intermediate the corners to form bracket attaching portions, and a bracket for each such portion, including opposed clamping members shaped to engage opposite sides of the deflected portion of the frame intermediate the corners so as to securely engage the frame to prevent turning of the bracket thereon.

2. A visor for automobiles comprising a marginal rectangular frame of rod material the end sides of which are laterally sinuously deflected intermediate the corners to form bracket attaching portions, a fabric cover over said frame, and a bracket for each end side of the frame including sheet-metal opposed clamping members sinuously grooved to conform to the deflected portions of the frame intermediate the corners, the opposed clamping members lying over the fabric, and means for drawing the clamping members together to securely embrace the deflected portions to prevent turning of the bracket on the frame.

3. A visor for automobiles comprising a rectangular marginal frame of rod material having projecting portions extending inwardly from and rigid with the frame intermediate the corners and at opposite sides thereof, and a bracket for application to the frame at each of said projecting portions thereof including opposed clamping members for engaging opposite sides of the projection and continuing portions of the frame intermediate the corners so as to securely engage the frame to prevent turning of the bracket thereon.

4. A device of the character described including a frame, sinuous lateral extensions carried thereby and arranged in transverse alignment intermediate the corners of the frame, an attaching bracket for each extension including a pair of opposed clamping plates provided with registering grooves shaped to conform to and receive the extensions and adjacent portions of the frame whereby the brackets are held against turning movement on the frame.

In witness whereof, I hereunto subscribe my name this 17th day of July, A. D. 1923.

OWEN E. GRIGSBY.